(12) United States Patent
Pontefract et al.

(10) Patent No.: US 11,897,361 B2
(45) Date of Patent: Feb. 13, 2024

(54) POWER CALCULATION APPARATUS AND POWER CALCULATION METHOD

(71) Applicant: Honda Motor Co., Ltd., Tokyo (JP)

(72) Inventors: Thomas Stephen Pontefract, Wako (JP); Hiroyuki Kanazawa, Wako (JP); Jun Kudo, Wako (JP); Ayano Otogasako, Wako (JP); Takayuki Sakurai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 17/211,368

(22) Filed: Mar. 24, 2021

(65) Prior Publication Data
US 2021/0300204 A1 Sep. 30, 2021

(30) Foreign Application Priority Data

Mar. 27, 2020 (JP) .................................. 2020-058024

(51) Int. Cl.
*B60L 58/13* (2019.01)
*G06Q 50/06* (2012.01)
(Continued)

(52) U.S. Cl.
CPC .............. *B60L 55/00* (2019.02); *B60L 53/18* (2019.02); *B60L 53/665* (2019.02); *B60L 58/13* (2019.02);
(Continued)

(58) Field of Classification Search
CPC .......... B60L 55/00; B60L 53/18; B60L 53/63; B60L 53/665; B60L 58/13;
(Continued)

(56) References Cited

U.S. PATENT DOCUMENTS

| 9,871,376 B2 * | 1/2018 | Shen ..................... G05B 13/021 |
| 11,107,094 B2 * | 8/2021 | Utsumi .................. G06Q 10/06 |

(Continued)

FOREIGN PATENT DOCUMENTS

| CN | 109472412 A | * | 3/2019 |
| JP | 2018110016 A | * | 7/2018 |

(Continued)

OTHER PUBLICATIONS

JP-2018110016-A machine translation.*
(Continued)

*Primary Examiner* — M. N. Von Buhr
(74) *Attorney, Agent, or Firm* — Duft & Bornsen, PC

(57) ABSTRACT

A power calculation apparatus calculates an amount of power suppliable and demandable between a battery and a power grid. The power calculation apparatus includes a microprocessor and a memory connected to the microprocessor. The microprocessor is configured to perform: predicting the amount of power suppliable and demandable between the battery and the power grid at a predetermined point in time to calculate a prediction value of the amount of power suppliable and demandable; and switching a calculation logic to be applied to a calculation of the prediction value, based on a length of duration from a present point in time to the predetermined point in time.

15 Claims, 5 Drawing Sheets

(51) Int. Cl.
*H02J 3/32* (2006.01)
*H02J 7/00* (2006.01)
*B60L 55/00* (2019.01)
*B60L 53/66* (2019.01)
*B60L 53/18* (2019.01)
*H02J 13/00* (2006.01)
*G06Q 10/04* (2023.01)
*G06Q 30/06* (2023.01)
*G06Q 40/04* (2012.01)

(52) U.S. Cl.
CPC ............ *G06Q 10/04* (2013.01); *G06Q 30/06* (2013.01); *G06Q 40/04* (2013.01); *G06Q 50/06* (2013.01); *H02J 3/322* (2020.01); *H02J 7/0048* (2020.01); *H02J 7/0063* (2013.01); *H02J 13/00028* (2020.01); *B60L 2240/622* (2013.01)

(58) Field of Classification Search
CPC .. B60L 2240/622; G06Q 10/04; G06Q 30/06; G06Q 30/0206; G06Q 30/23; G06Q 40/04; G06Q 50/06; H02J 3/003; H02J 3/004; H02J 3/008; H02J 3/144; H02J 3/322; H02J 7/0048; H02J 7/0063; H02J 7/0068; H02J 7/007; H02J 13/00028; H02J 2203/20; Y02T 10/70; Y02T 10/7072; Y02T 90/12; Y02T 90/14; Y02T 90/16; Y02E 60/00; Y02P 80/20; Y04S 10/126

See application file for complete search history.

(56) References Cited

U.S. PATENT DOCUMENTS

| | | | |
|---|---|---|---|
| 2011/0202192 A1 | 8/2011 | Kempton | |
| 2012/0095608 A1* | 4/2012 | Murakami | G06Q 30/0202 700/291 |
| 2012/0249068 A1 | 10/2012 | Ishida | |
| 2016/0343093 A1* | 11/2016 | Riland | G06Q 50/06 |
| 2019/0111805 A1* | 4/2019 | Hidaka | B60L 58/10 |
| 2019/0340545 A1* | 11/2019 | Minegishi | G01W 1/10 |
| 2020/0389029 A1* | 12/2020 | Minegishi | H02J 3/004 |

FOREIGN PATENT DOCUMENTS

| | | | | |
|---|---|---|---|---|
| JP | 2019204458 A | * | 11/2019 | |
| KR | 2013089782 A | * | 8/2013 | |
| WO | WO-2014175374 A1 | * | 10/2014 | .......... B60L 11/1816 |
| WO | 2015019585 A1 | | 2/2015 | |

OTHER PUBLICATIONS

CN-109472412-A machine translation.*
JP-2019204458-A machine translation.*
European Search Report; Application EP21164645; dated Sep. 7, 2021.

* cited by examiner

| No. | (LATITUDE, LONGITUDE) |
|---|---|
| 1 | $(lat_1, lng_1)$ |
| 2 | $(lat_2, lng_2)$ |
| ⋮ | ⋮ |
|  |  |
| n | $(lat_n, lng_n)$ |

US 11,897,361 B2

POWER CALCULATION APPARATUS AND POWER CALCULATION METHOD

CROSS-REFERENCE TO RELATED APPLICATION

This application is based upon and claims the benefit of priority from Japanese Patent Application No. 2020-058024 filed on Mar. 27, 2020, the content of which is incorporated herein by reference.

BACKGROUND OF THE INVENTION

Field of the Invention

This invention relates to a power calculation apparatus and a power calculation method calculating an amount of power suppliable and demandable to and from a power grid.

Description of the Related Art

As such an apparatus, a conventionally known apparatus predicts the amount of power suppliable to a power grid from factories and various facilities, and determines whether or not to bid for power in a power transaction market, based on the predicted amount of power (see, for example, WO2015/019585A1).

The bid power, however, may be transacted not only in the near future such as one hour later or one day later, but also in the far future such as one month later or one year later. As the duration from the point in time of bidding to the point in time of transaction in the future, it is more difficult to predict the amount of power suppliable to the power grid at the point in time of transaction in the future. Thus, the accuracy of prediction for the amount of power suppliable to the power grid may be lowered depending on the length from the present point in time to the point in time at which the power transaction is performed.

SUMMARY OF THE INVENTION

An aspect of the present invention is a power calculation apparatus calculating an amount of power suppliable and demandable between a battery and a power grid. The power calculation apparatus includes a microprocessor and a memory connected to the microprocessor, wherein the microprocessor is configured to perform: predicting the amount of power suppliable and demandable between the battery and the power grid at a predetermined point in time to calculate a prediction value of the amount of power suppliable and demandable; and switching a calculation logic to be applied to a calculation of the prediction value, based on a length of duration from a present point in time to the predetermined point in time.

Another aspect of the present invention is a power calculation method calculating an amount of power suppliable and demandable between a battery and a power grid. The power calculation method includes: predicting the amount of power suppliable and demandable between the battery and the power grid at a predetermined point in time to calculate a prediction value of the amount of power suppliable and demandable; and switching a calculation logic to be applied to a calculation of the prediction value, based on a length of duration from a present point in time to the predetermined point in time.

BRIEF DESCRIPTION OF THE DRAWINGS

The objects, features, and advantages of the present invention will become clearer from the following description of embodiments in relation to the attached drawings, in which.

DETAILED DESCRIPTION

An embodiment of the present invention will be described below with reference to FIGS. 1 to 6. A power calculation apparatus according to the embodiment of the present invention is an apparatus provided between a vehicle such as an electric vehicle (EV) and a power grid, and predicts and calculates the amount of power for transfer between a battery mounted on the vehicle and the power grid. Hereinafter, the power grid may be simply referred to as a grid.

Figure 1:
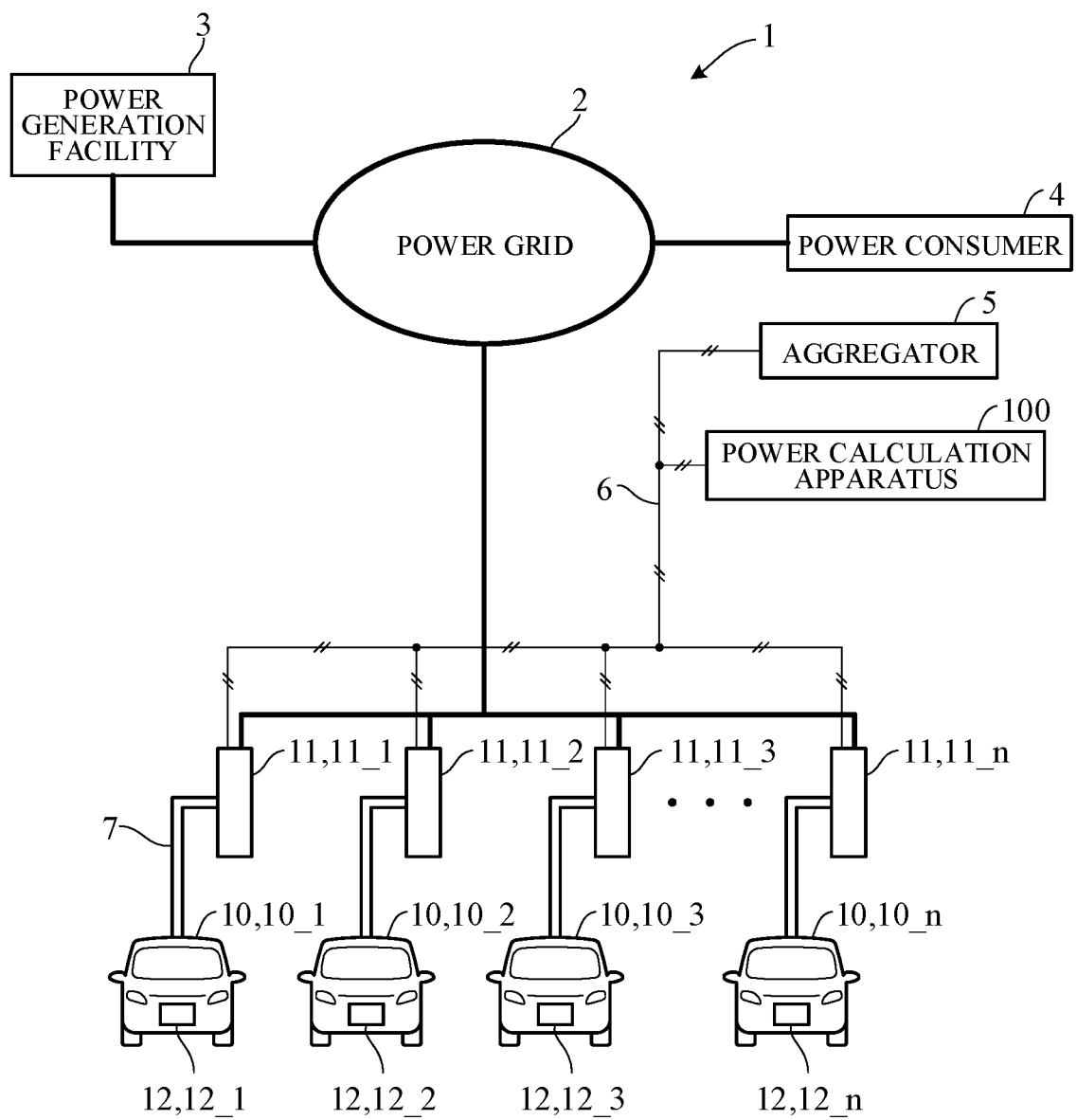
FIG. 1 is a diagram schematically showing a power system to which a power calculation apparatus according to an embodiment of the present invention is applied.

FIG. 1 schematically illustrates a power system to which the power calculation apparatus according to the present embodiment is applied. As illustrated in FIG. 1, a power system 1 to which a power calculation apparatus 100 is applied includes a power grid 2, a power generation facility 3 for supplying generated power to the power grid 2, and a power consumer 4 such as factories or various facilities supplied with power from the power grid 2.

The power system 1 also includes a plurality of EVs 10_1 to 10_n each transfer power between the EV 10 and the power grid 2, and a plurality of pieces of connection apparatus (electric vehicle supply equipment as abbreviated to EVSE) 11_1 to 11_n each interposed between the power grid 2 and the corresponding EV 10.

The batteries (hereinafter, referred to as on-vehicle batteries) 12_1 to 12_n are mounted one-to-one on the EVs 10_1 to 10_n.

The power system 1 further includes a server device (hereinafter, referred to as an aggregator) 5 for centrally managing power for input and output between the power grid 2 and each EV 10.

As illustrated in FIG. 1, the aggregator 5 and each piece of EVSE 11 are connected via a wired or wireless communication network 6, and are communicable with each other via the communication network 6.

Each piece of EVSE 11 and the corresponding EV 10 can be connected by a charging cable 7. Each piece of EVSE 11 and the corresponding EV 10 are capable of power transfer therebetween via the charging cable 7. In the present embodiment, each piece of EVSE 11 supplies power supplied from the power grid 2 to the corresponding EV 10 to charge the on-vehicle battery 12 of the EV 10. Each piece of EVSE 11 also supplies power from the corresponding on-vehicle battery 12 to the power grid 2 to make the on-vehicle battery 12 function as one of the power storage facilities in the power grid 2.

The aggregator 5 makes a bid for the power stored in each on-vehicle battery 12 to a power transaction market.

The power calculation apparatus 100 is disposed between the pieces of EVSE 11 and the aggregator 5. As illustrated in FIG. 1, the power calculation apparatus 100, each piece of EVSE 11, and the aggregator 5 are connected via a wired or wireless communication network 6 and are communicable with each other.

Figure 2:
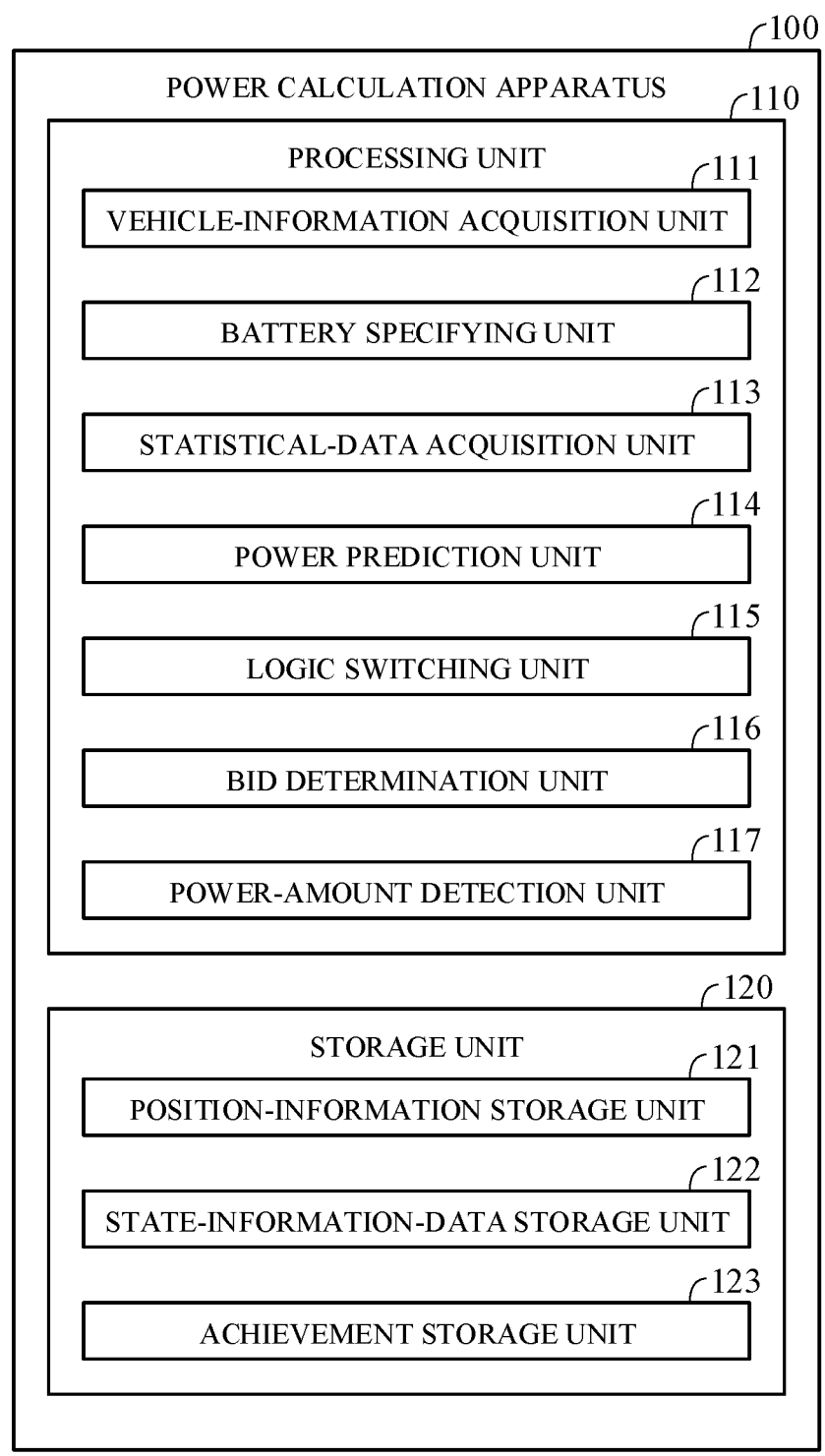
FIG. 2 is a diagram showing an exemplary functional configuration of the power calculation apparatus according to an embodiment of the present invention.

First, the configuration of the power calculation apparatus 100 according to the present embodiment will be described. FIG. 2 is a diagram illustrating an exemplary functional configuration of the power calculation apparatus 100. As illustrated in FIG. 2, the power calculation apparatus 100 includes an arithmetic unit 110 such as a central processing unit (CPU) (microprocessor), read only memory (ROM), random access memory (RAM), and a memory (storage unit) 120 such as a hard disk.

The arithmetic unit 110 executes a program stored in the storage unit 120 to function as a vehicle-information acquisition unit 111, a battery specifying unit 112, a statistical-data acquisition unit 113, a power prediction unit 114, a logic switching unit 115, a bid determination unit 116, and a power-amount detection unit 117. The storage unit 120 includes a position-information storage unit 121, a state-information-data storage unit 122, and an achievement storage unit 123.

The vehicle-information acquisition unit 111 acquires vehicle information from an EV 10. The vehicle-information acquisition unit 111 acquires, as the vehicle information, on-vehicle battery-remaining-capacity information indicating the remaining capacity of the on-vehicle battery and vehicle position information indicating the position of the vehicle. The vehicle-information acquisition unit 111 also acquires action plan information indicating an action plan of the vehicle, as the vehicle information. Note that the power calculation apparatus 100 is communicable with the EV 10 via a wireless communication network (not illustrated) and the vehicle-information acquisition unit 111 acquires the vehicle information from the EV 10 via the wireless communication network. In the present embodiment, it is assumed that the vehicle-information acquisition unit 111 acquires the vehicle information from the EV 10 at a predetermined cycle.

The battery specifying unit 112 specifies an on-vehicle battery 12 presently in connection with the power grid 2.

The statistical-data acquisition unit 113 acquires statistical data regarding the amount of power suppliable from the on-vehicle battery 12 to the power grid 2 in the past. Hereinafter, this statistical data will be referred to as "suppliable-power-amount statistical data". In the present embodiment, the statistical-data acquisition unit 113 calculates and acquires the suppliable-power-amount statistical data, based on the amount of power suppliable from the on-vehicle battery 12 to the power grid 2 predicted in the past by the power prediction unit 114.

The power prediction unit 114 predicts the amount of power suppliable from the on-vehicle battery 12 to the power grid 2 at a predetermined point in time (hereinafter, referred to as the amount of suppliable power). The power prediction unit 114 also calculates, based on the calculated amount of suppliable power, the amount of power suppliable and demandable between the on-vehicle battery 12 and the power grid 2 at the predetermined point in time (hereinafter, referred to as the amount of prediction supply-and-demand).

The amount of suppliable power calculated by the power prediction unit 114 is recorded chronologically in the achievement storage unit 123.

Figure 4A:
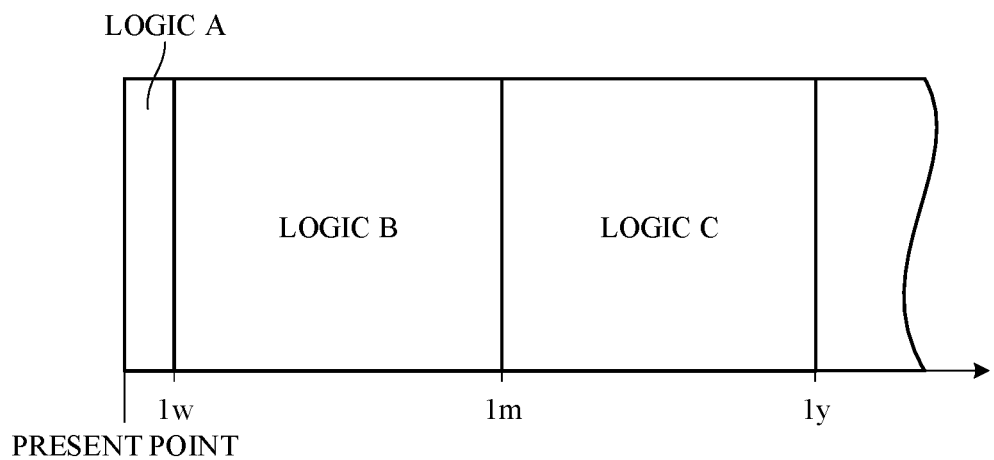
FIG. 4A is a graph conceptually showing switching of a calculation logic.

A method of predicting the amount of suppliable power will now be described. The power prediction unit 114 predicts the amount of suppliable power from each of the on-vehicle batteries 12 specified by the battery specifying unit 112 to the power grid 2 at a predetermined point in time. At this time, the logic switching unit 115 switches the calculation logic to be applied to the calculation of the amount of power predicted by the power prediction unit 114, based on the length of duration from the present point in time to the predetermined point in time. FIG. 4A is a graph conceptually illustrating the switching of the calculation logic. Note that 1w, 1m, and 1y in the figure represent in point in time of one week later, one month later, and one year later, respectively.

In the present embodiment, as illustrated in FIG. 4A, the calculation logic is switched between a case where the predetermined point in time is included in a first period from the present point in time to one week later, a case where the predetermined point in time is included in a second period from the one week later to one month later, and a case where the predetermined point in time is included in a third period from the one month later to one year later. Hereinafter, the calculation logic to be applied to the first period, the second period, and the third period will be referred to as logic A, logic B, and logic C, respectively. Note that if the predetermined point in time is after the one year, the logic C may be applied or different calculation logic may be applied.

The logic A is logic for calculating a prediction value of the amount of suppliable power at a predetermined point in time, with state-information data based on at least any of the connection state of a battery, the internal state of the battery, and the external environment state that affects the internal state of the battery, stored in the state-information-data storage unit 122. In the logic A, the suppliable-power-amount statistical data is not used.

The connection state of the battery is a connection state of the battery to the power grid 2. The internal state of the battery is, for example, the remaining capacity of the battery. Examples of the external environment state that affects the internal state of the battery include time zone, day of the week, and weather. The weather may be the weather at the present point in time or the weather at a predetermined point in time obtained from the weather forecast or the like at the present point in time. The time zone and the day of the week may be the time zone and the day of the week at a predetermined point in time. Note that in the present embodiment, the vehicle-information acquisition unit 111 chronologically records the battery-remaining-capacity information included in the vehicle information acquired from the EV 10, in the state-information-data storage unit 122. In addition, the power prediction unit 114 may acquire information regarding the time zone, the day of the week, and the weather, from an external device (not illustrated) via the communication network 6, or may acquire the information by another method.

The logic A will now be described. In the logic A, the remaining capacity of the battery in a predetermined duration is predicted from the remaining capacity of the battery at the present point in time, based on the discharge characteristics of the battery and the travel distance from the present point in time to the predetermined point in time obtained from the action plan information. Then, the prediction value is calculated as a prediction value of the amount of suppliable power at the predetermined point in time. In addition, in the logic A, the prediction value of the amount of suppliable power at the predetermined point in time is corrected in accordance with the time zone, the day of the week, and the weather at the present point in time or at the predetermined point in time.

Typically, the remaining capacity of the battery tends varies periodically in accordance with a time zone and a day of the week. For example, the amount of battery consumption on weekdays tends to be less than the amount of battery consumption on weekends because the number of short-distance movements is larger than the number of long-distance movements. Thus, in the logic A, in a case where weekends are included between the present point in time and the predetermined point in time, the correction is performed such that the prediction value of the amount of suppliable power at the predetermined point in time is smaller than a case where no weekends are included between the present point in time and the predetermined point in time.

In the present embodiment, a correction table for such a prediction value is stored in advance in the storage unit 120 so as to reduce the prediction value of the amount of suppliable power at the predetermined point in time in accordance with the length of weekends included between the present point in time and the predetermined point in time. Then, in the first period to which the logic A is applied, the power prediction unit 114 corrects, with the correction table, the prediction value of the amount of suppliable power at the predetermined point in time predicted from the remaining capacity of the battery at the present point in time. Specifically, the power prediction unit 114 acquires, from the correction table stored in the storage unit 120, a correction value corresponding to the length of weekends included between the present point in time and the predetermined point in time, and corrects, with the acquired correction value, the prediction value of the amount of suppliable power at the predetermined point in time.

Note that the power prediction unit 114 may multiply the prediction value of the amount of suppliable power at the predetermined point in time by a correction coefficient corresponding to the length of weekends included between the present point in time and the predetermined point in time to correct the prediction value.

In addition, temperature is generally lower in the morning and at night than in the daytime. The rate of decrease in the remaining capacity of the battery is higher as temperature decreases. Thus, in the logic A, in a case where a time zone in the morning or at night is included between the present point in time and the predetermined point in time, correction may be performed so as to reduce the prediction value of the amount of suppliable power at the predetermined point in time, as compared with a case where such a time zone is not included.

In addition, the temperature in a predetermined duration or the temperature variation from the present point in time to the predetermined point in time can be generally predicted from the season at the present point in time, the weather at the present point in time or at the predetermined point in time, the sunshine duration from the present point in time to the predetermined point in time, or the like. Thus, in the logic A, the prediction value of the amount of suppliable power in the predetermined duration may be corrected, based on the temperature at the predetermined point in time or the temperature variation from the present point in time to the predetermined point in time, predicted from the season, weather, or sunshine duration at the present point in time or at the predetermined point in time.

Note that in the first period to which the logic A is applied, if the predetermined point in time that is closer to the future (for example, one hour later) than the present point in time is, the battery specifying unit 112 may predict the likelihood of connection of the EV 10 to the power grid 2 via a piece of EVSE 11 at the predetermined point in time. Then, the battery specifying unit 112 may specify the on-vehicle battery 12 connectable to the power grid 2 at the predetermined point in time. A method of predicting the likelihood of connection of the EV 10 to the piece of EVSE 11 at a predetermined point in time will be described.

First, the battery specifying unit 112 predicts the position of the EV 10 at a predetermined point in time, based on the action plan information included in the vehicle information acquired by the vehicle-information acquisition unit 111. Next, the battery specifying unit 112 predicts the likelihood of connection of the EV 10 to the piece of EVSE 11 at the predetermined point in time, based on the predicted position of the EV 10 at the predetermined point in time and the position of the piece of EVSE 11. Note that the position information of the piece of EVSE 11 is stored in advance in the position-information storage unit 121.

Figure 3:
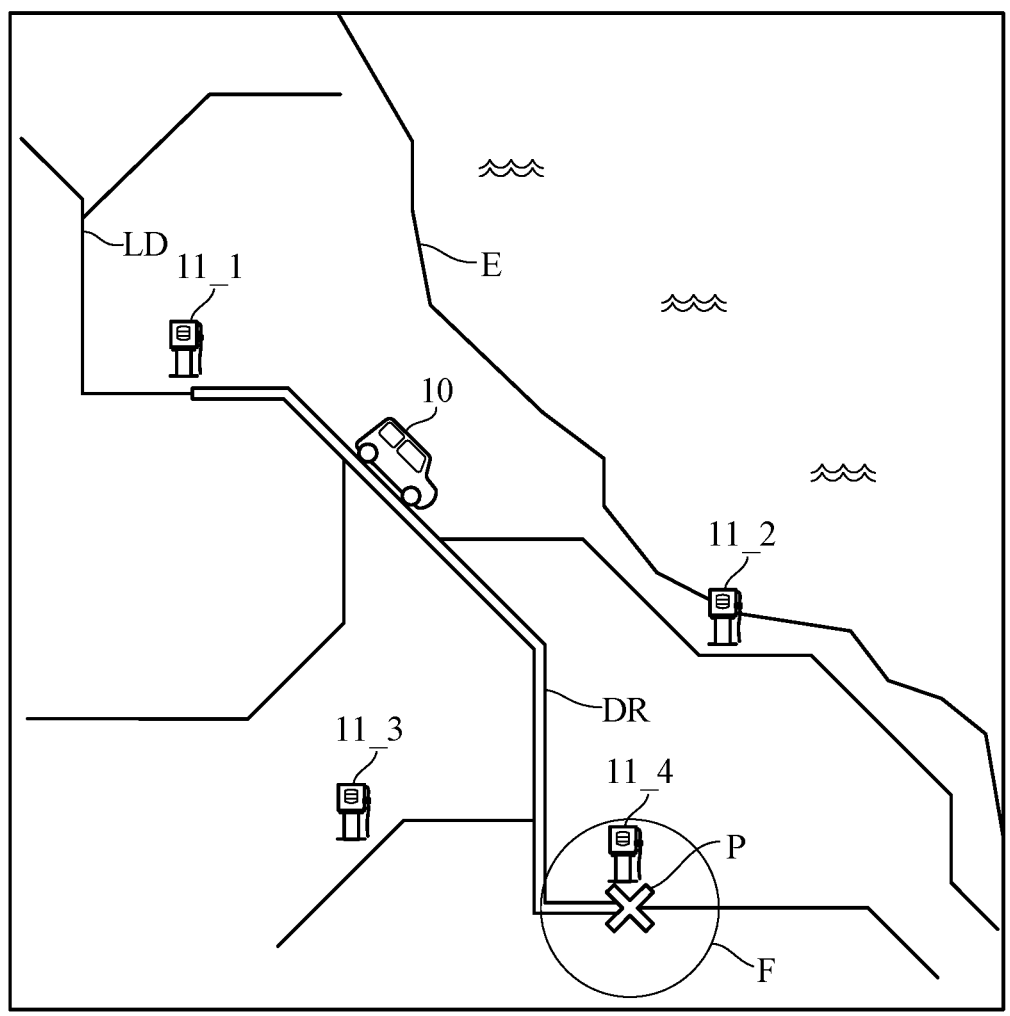
FIG. 3 is an explanatorily showing the likelihood of connection of a vehicle to a connection apparatus.

In the present embodiment, when the predicted position of the EV 10 at the predetermined point in time is within a predetermined distance from the position of any piece of EVSE 11, the battery specifying unit 112 determines that the EV 10 has the likelihood of connection to the piece of EVSE 11 at the predetermined point in time. FIG. 3 explanatorily illustrates the likelihood of connection of the EV 10 to the piece of EVSE 11.

FIG. 3 illustrates that the EV 10 is traveling on the road LD. The thick line DR in FIG. 3 indicates a travel route based on the action plan information acquired by the vehicle-information acquisition unit 111 from the EV 10. The position P indicates the position of the EV 10 at the predetermined point in time, specified from the action plan information. The area F indicates an area within a predetermined distance from the position P of the EV 10 at the predetermined point in time. In the example illustrated in FIG. 3, the piece of EVSE 11_4 is in the area F. Thus, it is determined that the EV 10 has the likelihood of connection to the piece of EVSE 11_4 at the predetermined point in time.

Note that based on vehicle information acquired from another EV 10, the battery specifying unit 112 may determine the congestion status of the road, the position of the other EV 10 that is traveling or stopped, and the like, and may determine the likelihood of connection of the EV 10 to the piece of EVSE 11 at the predetermined point in time.

The logic C is logic for calculating the prediction value of the amount of suppliable power at a predetermined point in time, based on the suppliable-power-amount statistical data.

The logic C will now be described. In logic C, data at the past point in time identical in year, month, day of the week, or time to the predetermined point in time acquired from the suppliable-power-amount statistical data, and the prediction value of the amount of suppliable power at the predetermined point in time is calculated based on the data.

Note that in the third period to which the logic C is applied, the power prediction unit 114 may calculate the prediction value of the amount of suppliable power at the predetermined point in time, based on the data acquired from the suppliable-power-amount statistical data, or may correct the data acquired from the suppliable-power-amount statistical data to calculate, bases on the corrected data, the prediction value of the amount of suppliable power at the predetermined point in time. For example, even if the year, month, day of the week, or time is identical to that at the predetermined point in time, temperature at the present point in time or at the predetermined point in time may be different, or the length of weekends included between the present point in time and the predetermined point in time may be different. Thus, also in the logic C, correction may be performed in accordance with the external environment, similarly to the logic A.

In addition, in the third period to which the logic C is applied, the power prediction unit 114 may acquire data over the past predetermined period from the suppliable-power-amount statistical data, and may calculate, based on the acquired data, the prediction value of the amount of suppliable power at the predetermined point in time. For example, the power prediction unit 114 predicts, with data for one year from the past to the present point in time, the transition of the amount of suppliable power from the present point in time to the predetermined point in time of one year later, and calculates, based on the predicted transition of the amount of suppliable power, the prediction value of the amount of suppliable power at the predetermined point in time. Note that a technique for predicting the transition of data or the like from statistical data is well known, and thus the detailed description will be omitted.

Thus, with the data over the past predetermined period, even if the predetermined point in time is a point in time in the far future such as one year later, the amount of suppliable power at the predetermined point in time can be predicted accurately. In the present embodiment, in the third period to which the logic C is applied, when the length from the present point in time to the predetermined point in time is not less than a predetermined length (for example, three months), the power prediction unit 114 calculates the prediction value of the amount of suppliable power at the predetermined point in time, with the data over the past predetermined period.

The logic B is logic in combination of the logic A and the logic C, and is logic for calculating the prediction value of the amount of suppliable power at a predetermined point in time, with both the state information data and the suppliable-power-amount statistical data. Note that in the logic B, the logic A and the logic C are combined such that the weighting of the suppliable-power-amount statistical data to the state information data increases as a duration from the present point in time to the predetermined point in time is longer.

Figure 4B:
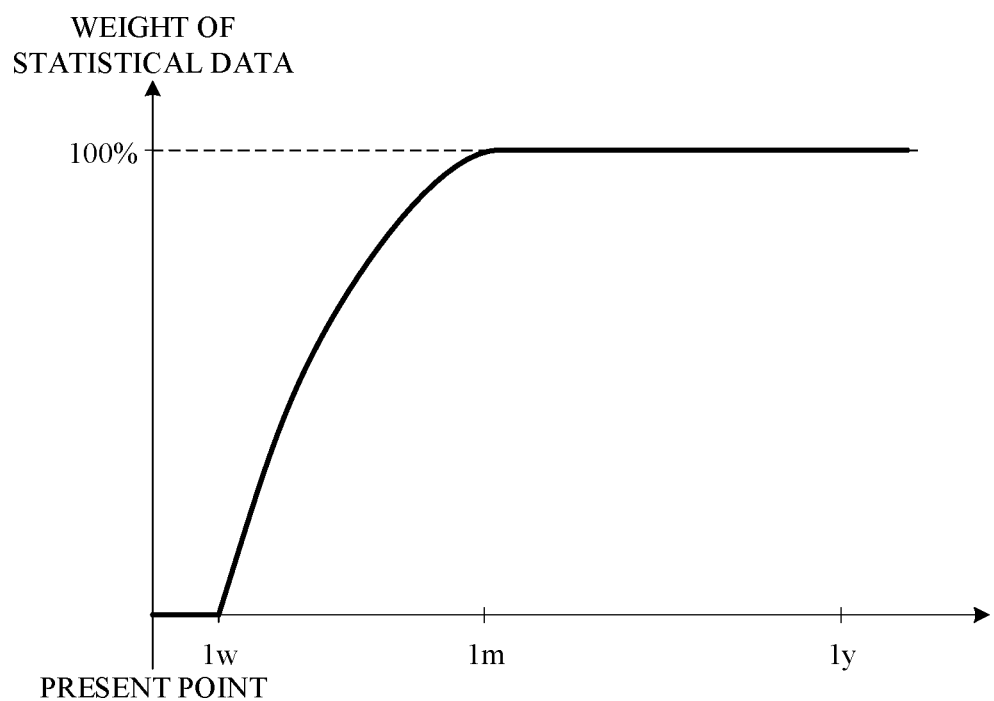
FIG. 4B is a graph conceptually showing a weight of statistical data to state information data.

Thus, as the duration from the present point in time to the predetermined point in time is longer, the weighting of the suppliable-power-amount statistical data to the state information data for use in the prediction of the amount of power by the power prediction unit 114 can increase. FIG. 4B is a graph conceptually illustrating the weight of the suppliable-power-amount statistical data to the state information data for use in the prediction of the amount of power by the power prediction unit 114.

FIG. 4B illustrates an example in which the logics A, B, and C are applied to the first, second, and third periods, respectively. Note that 1w, 1m, and 1y in the figure represent in point in time of one week later, one month later, and one year later, respectively. As illustrated in FIG. 4B, the weight of the suppliable-power-amount statistical data to the state information data gradually increases from the point in time of start of the second period, and reaches 100% at the point in time of start of the third period.

The bid determination unit 116 determines whether or not a bid for the amount power supplied from an on-vehicle battery 12 can be made in a power transaction market, based on the amount of suppliable power predicted by the power prediction unit 114.

The bid determination unit 116 determines that the bid in the power transaction market can be made, when the amount of suppliable power predicted by the power prediction unit 114 is not less than the amount of power required by the power transaction market, that is, not less than the amount of power to be transacted.

The bid determination unit 116 transmits information indicating the determination result of whether or not the bid can be made, to the aggregator 5. Then, in a case where the information received from the bid determination unit 116 indicates the bid can be made, the control unit (not illustrated) of the aggregator 5 performs the bid to the power transaction market.

The power-amount detection unit 117 detects the amount of power supplied from an on-vehicle battery 12 to the power grid 2. Specifically, the EV 10 is provided with a measuring instrument (not illustrated) for measuring the amount of power input to and output from the on-vehicle battery 12, and the power-amount detection unit 117 acquires, from the EV 10, the amount of power detected by the measuring instrument of the EV 10.

In the present embodiment, in response to the power transaction at a predetermined point in time, the power-amount detection unit 117 detects the amount of power supplied from the on-vehicle battery 12 to the power grid 2. Then, the power-amount detection unit 117 stores, in the achievement storage unit 123, prediction achievement information including information indicating a difference between the amount of power detected at the predetermined point in time and the amount of suppliable power at the predetermined point in time predicted by the power prediction unit 114.

The logic switching unit 115 changes the length of the first period in accordance with the level of the difference between the detection value of the amount of power detected by the power-amount detection unit 117 at the predetermined point in time and the value of the amount of suppliable power at the predetermined point in time predicted by the power prediction unit 114.

In addition, the logic switching unit 115 corrects the content of the state information data in accordance with the level of the difference between the detection value of the amount of power detected by the power-amount detection unit 117 at the predetermined point in time and the value of the amount of suppliable power at the predetermined point in time predicted by the power prediction unit 114. For example, the logic switching unit 115 uses state information data based on another state instead of the connection state of the battery, the internal state of the battery, or the external environment state. Alternatively, for example, the logic switching unit 115 uses state information data based on another state in addition to the connection state of the battery, the internal state of the battery, and the external environment state.

Figures 5, 6:
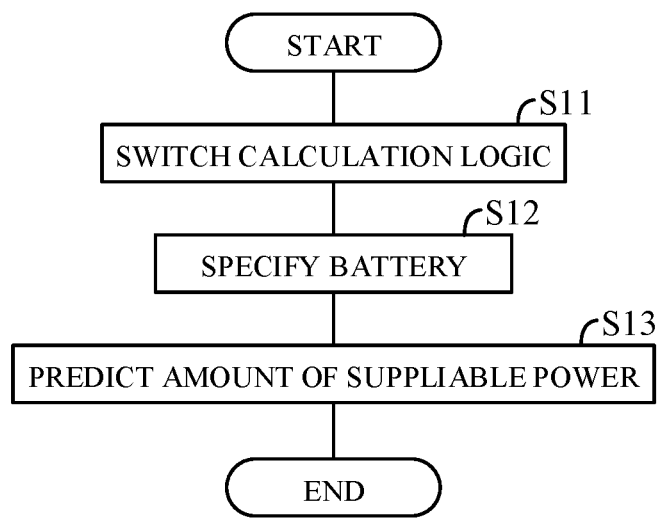
FIG. 5 is a diagram showing exemplary position information.
FIG. 6 is a flowchart illustrating an exemplary operation of the power calculation apparatus according to an embodiment of the present invention.

The position-information storage unit 121 stores in advance the position information of the piece of EVSE 11. FIG. 5 illustrates exemplary position information. As illustrated in FIG. 5, the position information indicates the position of a piece of EVSE 11. In the example illustrated in FIG. 5, the position of the piece of EVSE 11 is represented by latitude and longitude; however, the position of the piece of EVSE 11 may be represented by other parameters.

The state-information-data storage unit 122 stores state information data. In the present embodiment, the stateinformation-data storage unit 122 chronologically stores the state information data in the past predetermined period.

The achievement storage unit 123 chronologically stores prediction achievement information. The achievement storage unit 123 also chronologically stores the amount of suppliable power predicted in the past by the power prediction unit 114.

Next, the operation of the power calculation apparatus 100 according to the present embodiment will be described. FIG. 6 is a flowchart illustrating an exemplary operation of the power calculation apparatus 100. The processing illustrated in FIG. 6 is performed at any timing between the invitation for a bid and the deadline of the invitation in the power transaction market.

First, in Step S11, the logic switching unit 115 switches the calculation logic to be applied to the calculation of the amount of power predicted by the power prediction unit 114, based on the length of duration from the present point in time to a predetermined point in time. Note that it is assumed that the logic A is set as the calculation logic at the startup of the power calculation apparatus 100.

Next, in Step S12, the battery specifying unit 112 specifies a battery in connection with the power grid 2 at the predetermined point in time.

Next, in Step S13, the power prediction unit 114 predicts the amount of suppliable power, that is, the amount of power suppliable from the on-vehicle battery 12 specified by the battery specifying unit 112 to the power grid 2 at the predetermined point in time.

According to the embodiment of the present invention, the following functions and effects can be obtained.

(1) A power calculation apparatus 100 that calculates an amount of power suppliable and demandable between an on-vehicle battery 12 and a power grid 2, includes: a power prediction unit 114 configured to predict the amount of power suppliable and demandable between the on-vehicle battery 12 and the power grid 2 at a predetermined point in time; and a logic switching unit 115 configured to switch calculation logic to be applied to calculation of the amount of power predicted by the power prediction unit 114, based on a length of duration from a present point in time point to the predetermined point in time.

Thus, even in a case where a point in time at which a power transaction is performed is the present point in time or a point in time in the near future such as one day later, or a point in time in the far future such as one month later or one year later, the amount of power suppliable to the power grid from the battery in connection with the power grid at the point in time of the transaction can be calculated accurately.

(2) The power calculation apparatus 100 further includes: a statistical-data acquisition unit 113 configured to acquire statistical data regarding an amount of power suppliable to the power grid 2 in past, based on the amount of power suppliable to the power grid 2 predicted in the past by the power prediction unit 114. Based on state information data based on at least any of a connection state of the on-vehicle battery 12, an internal state of the on-vehicle battery 12, and an external environment state that affects the internal state of the on-vehicle battery 12, and the statistical data, the power prediction unit 114 predicts the amount of power suppliable to the power grid 2 at the predetermined point in time, and the logic switching unit 115 switches the calculation logic such that the power prediction unit 114 predicts the amount of power with the statistical data weighted larger to the state information data as the duration from the present point in time to the predetermined point in time is longer. Thus, as the point in time at which the power transaction is performed is closer to the present point in time, the present data is used frequently in the prediction of the amount of power suppliable from the battery to the power grid. On the other hand, as the point in time at which the power transaction is performed is farther from the present point in time, the achievement in the past is used more frequently in the prediction of the amount of power suppliable from the battery to the power grid. Therefore, the amount of power suppliable from the battery to the power grid can be predicted accurately regardless of the point in time at which the power transaction is performed.

(3) The calculation logic includes first calculation logic in which the state information data is used and second calculation logic in which the statistical data is used. The logic switching unit 115: applies the first calculation logic to the calculation of the prediction value by the power prediction unit 114, when the predetermined point in time is included in a first period from the present point in time to a first point in time; and applies the second calculation logic to the calculation of the prediction value by the power prediction unit 114, when the predetermined point in time is included in a second period from the first point in time to a second point in time that is closer to the future than the first point in time is; and in the first calculation logic, the state information data includes any of a remaining capacity of the battery at the present point in time, a time zone at the present point in time, a day of a week at the present point in time, and weather at the predetermined point in time predicted at the present point in time. Thus, in prediction of the amount of suppliable power at the present point in time or in the near future such as one day later, the remaining capacity of the battery at the present point in time, the time zone at the point in time, the weather, and the like are taken into consideration, so that the accuracy of prediction for the amount of suppliable power in the near future can be improved.

(4) The calculation logic includes the first calculation logic in which the state information data is used and the second calculation logic in which the statistical data is used, in which the logic switching unit 115: applies the first calculation logic to the calculation of the prediction value by the power prediction unit 114, when the predetermined point in time is included in the first period from the present point in time to the first point in time; and applies the second calculation logic to the calculation of the prediction value by the power prediction unit 114, when the predetermined point in time is included in the second period from the first point in time to the second point in time that is closer to the future than the first point in time is; and in the second calculation logic, the statistical data over a predetermined period of an amount of power suppliable to the power grid 2 in the past is used, or the statistical data of an amount of power suppliable to the power grid 2 at a past point in time identical in year, month, or time to the predetermined point in time is used. Thus, the accuracy of prediction in the prediction of the amount of suppliable power in the far future such as six months later or one year later can be further improved.

(5) The power calculation apparatus 100 further includes: a power-amount detection unit 117 configured to detect the amount of power supplied from the on-vehicle battery 12 to the power grid 2, in which the logic switching unit 115 changes a length of the first period or a content of the state information data in accordance with a level of a difference between a value (prediction value) of the amount of power suppliable to the power grid 2 at the predetermined point in time predicted by the power prediction unit 114 and a detection value of the amount of power detected by the power-amount detection unit 117 at the predetermined point in time. Thus, the accuracy of prediction for the amount of suppliable power at the present point in time or in the near future such as one day later can be optimized.

The above embodiment may be modified variously. Such modifications will be described below. There has been exemplified in the above embodiment that one aggregator 5 is provided in the power system 1. However, in a case where a plurality of aggregators is provided in a power system and the aggregators manage one-to-one EV groups different from each other, a power management apparatus may be disposed between each aggregator and the corresponding EV group.

In addition, there has been exemplified in the above embodiment that the power calculation apparatus 100 is provided outside the aggregator 5. A power calculation apparatus, however, may be provided inside an aggregator.

In the present embodiment, all of the remaining capacity of an on-vehicle battery 12 is used to calculate the amount of suppliable power. However, in a case where the user provides the power of the on-vehicle battery 12 to the power grid via a piece of electric vehicle supply equipment (EVSE) at a remote location, it is assumed that the user provides the power of the on-vehicle battery 12 while leaving power of a predetermined capacity necessary and enough to return home. Thus, a value obtained by subtracting the predetermined capacity from the battery remaining capacity of the on-vehicle battery may be used in the calculation logic for the first period.

In addition, there has been exemplified in the above embodiment that the on-vehicle battery 12 as a mobile battery is connected to the power grid 2. However, the mobile battery connected to the power grid 2 is not limited to such an on-vehicle battery.

In addition, there has been exemplified in the above embodiment that the statistical-data acquisition unit 113 calculates the suppliable-power-amount statistical data. However, the statistical-data acquisition unit 113 may acquire the suppliable-power-amount statistical data from a database possessed by an external device. In this case, the amount of suppliable power calculated by the power prediction unit 114 may be transmitted to the external device to cause the external device to calculate the suppliable-power-amount statistical data.

There has been further exemplified in the present embodiment that the EVs 10_1 to 10_n are in connection with the aggregator 5. An aggregator, however, may be in connection with a fixed battery fixed and provided to a house or the like, such as a battery for storing power by solar power generation.

The above embodiment can be combined as desired with one or more of the above modifications. The modifications can also be combined with one another.

According to the present invention, the amount of power suppliable to a power grid can be calculated accurately.

Above, while the present invention has been described with reference to the preferred embodiments thereof, it will be understood, by those skilled in the art, that various changes and modifications may be made thereto without departing from the scope of the appended claims.

What is claimed is:

1. A power calculation apparatus calculating an amount of power suppliable and demandable between a battery and a power grid, the power calculation apparatus comprising
a microprocessor and a memory connected to the microprocessor, wherein the microprocessor is configured to perform:
acquiring statistical data regarding an amount of power suppliable to the power grid in past;
predicting the amount of power suppliable and demandable between the battery and the power grid at a predetermined point in time to calculate a prediction value of the amount of power suppliable and demandable; and
switching calculation logic to be applied to a calculation of the prediction value, based on a length of duration from a present point in time to the predetermined point in time, wherein
the microprocessor is configured to perform
the predicting including predicting, based on state information data indicating at least any of a connection state of the battery, an internal state of the battery, and an external environment state affecting the internal state of the battery, and the statistical data, the amount of power suppliable to the power grid at the predetermined point in time,
the calculation logic includes first calculation logic in which the state information data of the battery is used, second calculation logic in which both the state information data and the statistical data are used, and third calculation logic in which the statistical data is used, and
the switching including applying the first calculation logic to the calculation of the prediction value when the predetermined point in time is included in a first period from the present point in time to a first point in time, applying the second calculation logic to the calculation of the prediction value when the predetermined point in time is included in a second period from the first point in time to a second point in time later than the first point, applying the third calculation logic to the calculation of the prediction value when the predetermined point in time is included in a third period later than the second point in time, and when applying the second calculation logic to the calculation of the prediction value, increasing a weight of the statistical data to the state information data for use in the calculation of the prediction value as the duration from the present point in time to the predetermined point in time is longer.

2. The power calculation apparatus according to claim 1, wherein
in the first calculation logic, any of a remaining capacity of the battery at the present point in time, a time zone at the present point in time, a day of a week at the present point in time, and weather at the predetermined point in time predicted at the present point in time are used.

3. The power calculation apparatus according to claim 2, wherein
the microprocessor is configured to perform
the predicting including using, when a remaining storage capacity of the battery at the present pot in time is used as the state information in the first calculation logic and the second calculation logic, a value obtained by subtracting a predetermined capacity from a remaining storage capacity of an on-vehicle battery as the state information if the battery is the on-vehicle battery.

4. The power calculation apparatus according to claim 1, wherein
in the second calculation logic and third calculation logic the statistical data over a predetermined period of the amount of power suppliable to the power grid in the past, or the statistical data of the amount of power suppliable to the power grid at a past point in time identical in year, month, or time to the predetermined point in time is used.

5. The power calculation apparatus according to claim 1, wherein
the microprocessor is configured to further perform
detecting an amount of power supplied from the battery to the power grid to obtain a detection value of the amount of power supplied from the battery to the power grid, and
the switching including changing a length of the first period or a content of the state information data in accordance with a level of a difference between the prediction value of the amount of power suppliable to the power grid at the predetermined point in time and the detection value at the predetermined point in time.

6. The power calculation apparatus according to claim 1, wherein
the microprocessor is configured to perform
the predicting including multiplying a larger correction coefficient as a length of weekends included between the present point in time and the predetermined point in time is longer, to correct the prediction value.

7. The power calculation apparatus according to claim 1, wherein
the microprocessor is configured to further perform
when the battery is a battery on a vehicle, acquiring action plan information indicating a travel route of the vehicle from the present point in time to the predetermined point in time,
the internal state of the battery indicated by the state information includes a remaining capacity of the battery, and
the microprocessor is configured to perform
the predicting including predicting, when the first calculation logic is applied, the remaining capacity of the battery at the predetermined point in time from the remaining capacity of the battery at the present point in time indicated by the state information data, based on a discharge characteristic of the battery and a travel distance of the vehicle from the present point in time to the predetermined point in time obtained from the travel route indicated by the action plan information.

8. The power calculation apparatus according to claim 7, wherein
a memory stores position information of a connection apparatus connected to the battery and supplying the power supplied form the battery to the power grid,
the microprocessor is configured to further perform
specifying the battery mounted on the vehicle whose position at the predetermined point in time is within a predetermined distance from a position of the connection apparatus as the battery in connection with the power grid at the predetermined point in time based on the position information of the connection apparatus stored in the memory and the action plan information, and
the microprocessor is configured to perform
the predicting including predicting the amount of power suppliable at the predetermined point in time from the battery to the power grid.

9. A power calculation apparatus calculating an amount of power suppliable and demandable between a battery and a power grid, the power calculation apparatus comprising
a microprocessor and a memory connected to the microprocessor, wherein the microprocessor is configured to function as:

a statistical-data acquisition unit configured to acquire statistical data regarding an amount of power suppliable to the power grid in past;
a power prediction unit configured to predict the amount of power suppliable and demandable between the battery and the power grid at a predetermined point in time to calculate a prediction value of the amount of power suppliable and demandable; and
a logic switching unit configured to switch calculation logic to be applied to a calculation of the prediction value by the power prediction unit, based on a length of duration from a present point in time to the predetermined point in time, wherein
the power prediction unit predicts, based on state information data indicating at least any of a connection state of the battery, an internal state of the battery, and an external environment state affecting the internal state of the battery, and the statistical data, the amount of power suppliable to the power grid at the predetermined point in time,
the calculation logic includes first calculation logic in which the state information data of the battery is used, second calculation logic in which both the state information data and the statistical data are used, and third calculation logic in which the statistical data is used, and
the logic switching unit is configured to apply the first calculation logic to the calculation of the prediction value when the predetermined point in time is included in a first period from the present point in time to a first point in time, apply the second calculation logic to the calculation of the prediction value when the predetermined point in time is included in a second period from the first point in time to a second point later than the first point in time, apply the third calculation logic to the calculation of the prediction value when the predetermined point in time is included in a third period later than the second point in time, and when applying the second calculation logic to the calculation of the prediction value, increase a weight of the statistical data to the state information data for use in the calculation of the prediction value as the duration from the present point in time to the predetermined point in time is longer.

10. The power calculation apparatus according to claim 9, wherein
in the first calculation logic, any of a remaining capacity of the battery at the present point in time, a time zone at the present point in time, a day of a week at the present point in time, and weather at the predetermined point in time predicted at the present point in time are used.

11. The power calculation apparatus according to claim 10, wherein
the power prediction unit uses, when a remaining storage capacity of the battery at the present point in time is used as the state information in the first calculation logic and the second calculation logic, a value obtained by subtracting a predetermined capacity from a remaining storage capacity of an on-vehicle battery as the state information if the battery is the on-vehicle battery.

12. The power calculation apparatus according to claim 9, wherein
in the second calculation logic and third calculation logic the statistical data over a predetermined period of the amount of power suppliable to the power grid in the past, or the statistical data of the amount of power suppliable to the power grid at a past point in time identical in year, month, or time to the predetermined point in time is used.

13. The power calculation apparatus according to claim 9, wherein
the microprocessor is configured to further perform
a power-amount detection unit configured to detect an amount of power supplied from the battery to the power grid to obtain a detection value of the amount of power supplied from the battery to the power grid, wherein
the logic switching unit changes a length of the first period or a content of the state information data in accordance with a level of a difference between the prediction value of the amount of power suppliable to the power grid at the predetermined point in time calculated by the power prediction unit and the detection value detected by the power-amount detection unit.

14. The power calculation apparatus according to claim 9, wherein
the power prediction unit multiplies a larger correction coefficient as a length of weekends included between the present point in time and the predetermined point in time is longer, to correct the prediction value.

15. A power calculation method calculating an amount of power suppliable and demandable between a battery and a power grid, the power calculation method comprising:
acquiring statistical data regarding an amount of power suppliable to the power grid in past;
predicting the amount of power suppliable and demandable between the battery and the power grid at a predetermined point in time to calculate a prediction value of the amount of power suppliable and demandable; and
switching calculation logic to be applied to a calculation of the prediction value, based on a length of duration from a present point in time to the predetermined point in time, wherein
the predicting includes predicting, based on state information data indicating at least any of a connection state of the battery, an internal state of the battery, and an external environment state affecting the internal state of the battery, and the statistical data, the amount of power suppliable to the power grid at the predetermined point in time,
the calculation logic includes first calculation logic in which the state information data of the battery is used, second calculation logic in which both the state information data and the statistical data are used, and third calculation logic in which the statistical data is used, and
the switching includes applying the first calculation logic to the calculation of the prediction value when the predetermined point in time is included in a first period from the present point in time to a first point in time, applying the second calculation logic to the calculation of the prediction value when the predetermined point in time is included in a second period from the first point in time to a second point later than the first point in time, applying the third calculation logic to the calculation of the prediction value when the predetermined point in time is included in a third period later than the second point in time, and when applying the second calculation logic to the calculation of the prediction value, increasing a weight of the statistical data to the state information data for use in the calculation of the prediction value as the duration from the present point in time to the predetermined point in time is longer.

* * * * *